June 24, 1941.　　C. J. VOLLBERG ET AL　　2,246,823
RADIATOR PROTECTOR
Filed April 25, 1940
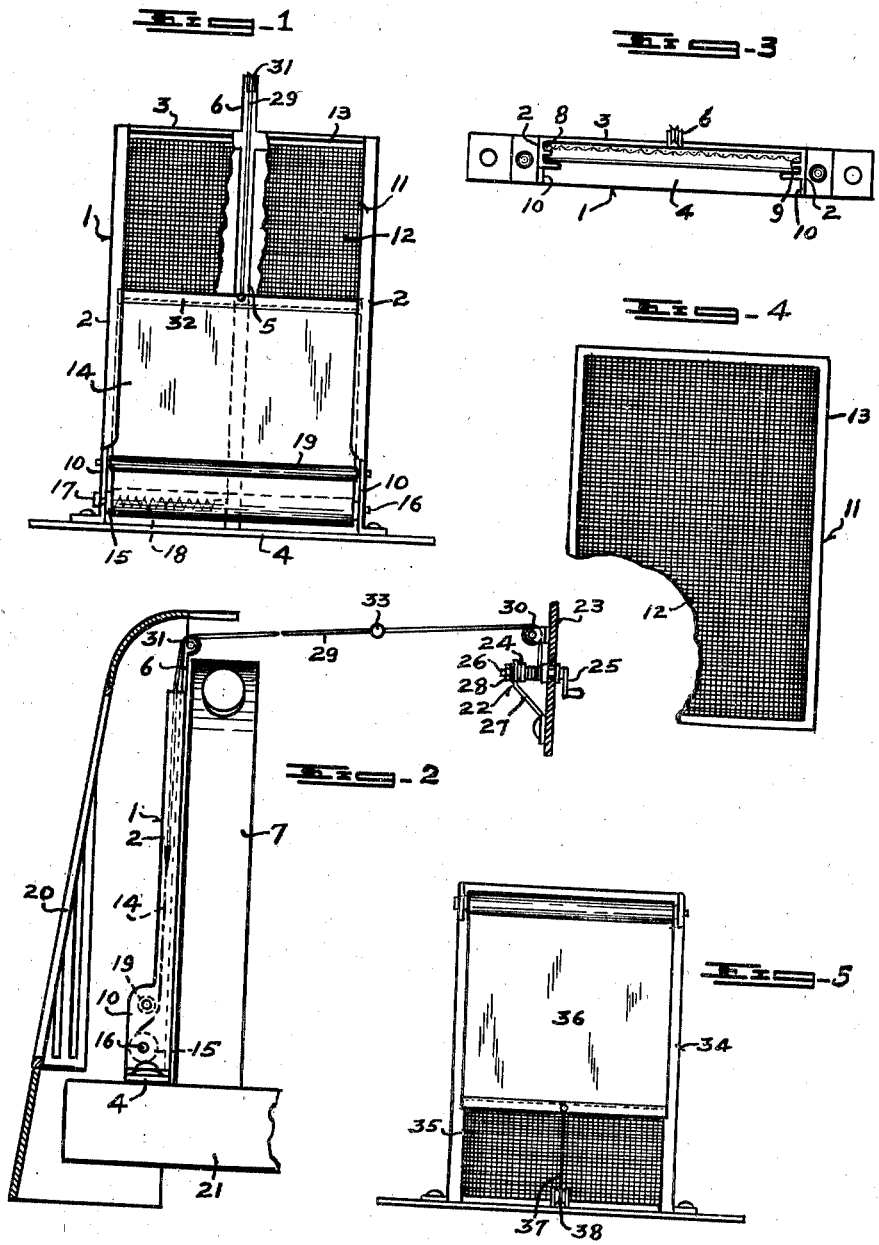
Inventors
Carl J. Vollberg
Eugene A. Myers
By Jack Snyder
Attorney Patented June 24, 1941

2,246,823

UNITED STATES PATENT OFFICE 2,246,823

RADIATOR PROTECTOR

Carl J. Vollberg and Eugene A. Myers, Pittsburgh, Pa.

Application April 25, 1940, Serial No. 331,556

4 Claims. (Cl. 257—132)

This invention relates to a protector for the radiator of an internal combustion engine of a motor vehicle, and important objects and advantages thereof are to provide a protector of the character described, which combines a construction embodying a winter front for regulating the cooling efficiency of the radiator in accordance with temperature conditions and a screen providing a backing member for the winter front and preventing the entrance of insects and other extraneous matter into the radiator, which may be conveniently adjusted by the operator from the driver's seat, and which may be readily installed in a motor vehicle already constructed as well as form a permanent component part of a new vehicle structure.

Further objects of the invention are to provide a device of the class stated, which is simple in its construction and arrangement, durable and efficient in its use, compact, and comparatively economical in its manufacture, installation and maintenance.

With the foregoing and other objects in view which will appear as the description proceeds, the invention resides in the novel construction, combination and arrangement of parts herein specifically described and illustrated in the accompanying drawing, but it is to be understood that the latter is merely illustrative of an embodiment of the invention, and that the actual needs of practice and manufacture may require certain mechanical variations from the embodiment shown. It is, therefore, not intended to limit the invention to the disclosure thereof herein illustrated, but rather to define such limitations to the scope of the claims hereunto appended.

In the drawing wherein like numerals of reference designate corresponding parts throughout the several views:

Figure 1 is a front view of a radiator protector constructed in accordance with the present invention.

Figure 2 is a side view thereof and illustrating its adaptation to a motor vehicle structure.

Figure 3 is a top plan view of the protector frame.

Figure 4 is a fragmentary front view of the screen.

Figure 5 is a front view of a modified form of protector, embodying the present invention.

Referring in detail to the drawing 1 denotes a rigid frame and comprises a pair of vertically disposed side members 2, a horizontally disposed top member 3, a horizontally disposed base member 4, and a vertically disposed center member 5 joined with said top and base members and including an aligned supporting arm 6 extending above the top member. All parts of the frame are permanently secured together to form a rigid structure. The frame is substantially rectangularly-shaped and is of a size generally conforming to the height and width of the radiator 7 in connection with which the protector is to be employed.

Each of the side members 2 is formed to provide a rear guide channel 8 and a front guide channel 9. The channels extend vertically and are open at their tops and inner sides. The guide channels of one of the side members are disposed parallel to respective guide channels of the other of said side members. The lower end of each of the side members is flat and enlarged to form a forwardly disposed bearing bracket 10.

A screen 11, consisting of a rectangularly-shaped sheet of suitable mesh wire 12 surrounded by a rigid screen frame 13, is removably mounted in the frame 1 and is engaged in the rear guide channels 8 of the side members 2. The removal of the screen from the frame 1 will facilitate the cleaning or replacement thereof without disturbing any other parts of an installed protector. The obvious purpose of the screen 11 is to prevent the entrance of insects and other foreign matter into the radiator, but the more important function of the screen resides in the latter providing a backing member for the winter front in the form of a curtain 14 employed for regulating the cooling efficiency of the radiator in accordance with temperature conditions.

The curtain may be constructed of any suitable, flexible sheet material, and is wound on a curtain roller 15. The latter is disposed horizontally at the lower end of the frame 1, and is carried by a pair of trunnions, respectively indicated at 16 and 17, which are preferably removably engaged in respective bearing brackets 10 of the side members 2. The trunnion 16 is freely revoluble in its bearing bracket, and the other trunnion 17 is flattened and held against rotation in its engagement in its bearing bracket. The trunnion 17 is attached to a spiral spring 18 within the roller 15 in the same manner as an ordinary window shade roller, so that the curtain 14 is unwound from the roller 15 under tension, and when released will automatically wind up upon said curtain roller.

The curtain 14, when adjusted, is shiftably engaged for vertical movement in the front guide channels 9 of the side members 2. The curtain rollers is positioned rearwardly of the curtain disposing same between the latter and the screen 11, whereby said curtain roller and the wound curtain portion are housed and shielded against the accumulation of dirt, grease, and other matter untoward and detrimental to their life and operation.

Due to such rearward position of the curtain roller 15, a horizontally disposed guide roller 19 is revolubly mounted in the bearing brackets 18, and is disposed above and adjacent to the curtain roller 15. The guide roller 19 engages the front face of the curtain 14 and directs the latter against the front face of the screen 11, during the adjustment of the curtain in the guide channels 9.

As clearly illustrated in Figure 2, the protector device is positioned vertically between the grill 20 and the engine radiator 7 in close proximity to the latter. The frame 1 carrying the screen 11 and the curtain 14, is rigidly secured to the motor vehicle frame 21 or to any other suitable part of the motor vehicle chassis in any suitable manner.

The adjustment of the curtain 14 in the frame 1 is controlled by a small winch mechanism 22 preferably mounted on the instrument board 23 of the motor vehicle. The winch mechanism includes a drum 24 mounted on the inner side of the instrument board, and an operating handle 25 mounted on the outer side of the latter within convenient reach of the operator from the driver's seat. The drum and operating handle are fixed on a common shaft 26, the inner end of which latter projects through a resilient supporting bracket 27 secured to the inner side of the instrument board. An adjusting nut 28 is engaged on the projecting end of the shaft, and the adjustment of the former on the latter determines the required frictional retardation applied to the drum operations.

An operating cable 29 passes over a sheave 30 supported at the inner side of the instrument board 23 above the drum 24, and over a sheave 31 carried at the upper end of the supporting arm 6 of the frame 1. One end of the cable is secured to and winds on the drum, and the other end thereof is joined with the reenforced free end 32 of the curtain 14.

When the operating handle 25 is turned in the clockwise direction the winch mechanism 22 will be operated to shift or pull the curtain upwardly to the closing position in front of the screen 11, and when the operating handle is turned in the opposite or the counter-clockwise direction, the winch mechanism will function to release the cable 29 and thereby allow the curtain 14 to be automatically rewound on the curtain roller 15 while being shifted to the open position. Due to the automatic functions of the spring actuated curtain roller 15, the cable 29 and any unwound portion of the curtain 14 will be suitably held in a taut condition at all times regardless of the relative position of the curtain in the frame 1. The proper adjustment of the nut 28 on the shaft 26 will frictionally retard and prevent the free movement of the winch mechanism, whereby the curtain is held against movement at any adjusted position in the frame 1.

A stop member 33 may be fixed and located in the cable 29 to limit the upward or closing movement of the curtain 14 when said stop member strikes the sheave 30, whereby the pulling strain on the curtain is discontinued and transferred to the cable only when the curtain has reached the fully closing position. Further, the position of the stop member relatively to the sheave 30 will apprise the observer of the adjusted position of the curtain in the frame 1 without actually viewing said curtain itself.

The modified embodiment of the invention disclosed in Figure 5, differs from the preferred form of the device in that the frame 34 is constructed of flat members without guide channels. The screen 35 is permanently secured to the frame 34, and the position of the curtain 36 is reversed, being connected at the top of the frame 34. No guide roller is required as the winding roller of the curtain 36 is disposed forwardly of the curtain itself. The adjustment of the curtain 36 necessitates a downward pull on a cable 37, which latter passes through a sheave 38 at the bottom of the frame 34 and connects with the operating or winch mechanism.

A most important feature of the invention resides in the novel manner in which the screen is employed as a backing means for the curtain. The latter, when unwound from the curtain roller, is positioned flatly against the front face of the screen. The curtain may be constructed of comparatively inexpensive material that is relatively light in weight. The curtain is not subjected to undue severe usage, as the construction, arrangement and operation of the device do not cause the curtain to be forcibly sucked against the air passages of the conventional radiator structure.

The present invention combines a winter front, air filter and screen, and provides a most economical and efficient device of its kind, which may be conveniently and successfully employed in the manner and for the purposes herein set forth.

What we claim is:

1. In a protector for the radiator of a motor vehicle, the combination of a rectangularly-shaped frame secured in the vertical position to the vehicle chassis forwardly of and in proximity to the radiator, said frame embodying a pair of vertical side members, each of said side members being provided with vertically extending front and rear channels opening at the inner sides and top thereof, a screen mounted in said rear channels, a curtain roller mounted in the lower end of said frame, a curtain engaged in said front channels and having one end thereof secured to said curtain roller, said curtain roller being spring actuated to normally wind said curtain thereon, and an operating mechanism mounted on the instrument board of the vehicle and including a cable connected therewith and with the free end of said curtain and being operable for adjusting the latter in said frame.

2. In a protector for the radiator of a motor vehicle, the combination of a frame secured in the vertical position to the vehicle chassis forwardly of and in proximity to the radiator, said frame embodying a pair of vertical side members, each of said side members being provided with vertically extending front and rear channels opening at the inner sides and tops thereof, a screen mounted in said rear channels, a curtain roller mounted at the lower end of said frame, a curtain engaged in said front channels and having one end thereof secured to said curtain roller, said curtain roller being spring actuated to normally wind said curtain thereon, an operating mechanism mounted on the instrument board of the vehicle and including a cable connected therewith and with the free end of said curtain and being operable for adjusting the latter in said frame, and a guide roller for said curtain mounted in said frame.

3. In a protector for the radiator of a motor vehicle, the combination of a frame secured in the vertical position to the vehicle chassis forwardly of and in proximity to the radiator, said frame embodying a pair of vertical side members, each of said side members being provided with a vertically extending front and rear channel opening at the inner sides and tops thereof, a screen removably mounted in said rear channels, a curtain roller mounted at the lower end of said frame, a curtain engaged in said front channels and having one end thereof secured to said curtain roller, said curtain roller being spring actuated to normally wind said curtain thereon, an operating mechanism mounted on the instrument board of the vehicle and including a cable connected therewith and with the free end of said curtain and being operable for adjusting the latter in said frame, and means fixed on said cable for limiting the adjustment movement of said curtain in said frame.

4. In a protector for the radiator of a motor vehicle, the combination of a frame secured in the vertical position to the vehicle chassis forwardly of and in proximity to the radiator, said frame embodying a pair of vertical side members, each of said side members being provided with vertically extending front and rear channels opening at the inner sides and top thereof, a screen removably mounted in said rear channels, a curtain roller mounted at the lower end of said frame, a curtain engaged in said front channels and having one end thereof secured to said curtain roller, said spring roller being spring actuated to normally wind said curtain thereon, a frictionally controlled operating mechanism mounted on the instrument board of the vehicle and including a cable connected therewith and with the free end of said curtain and being operable for adjusting said curtain in said frame relatively to said curtain roller, means fixed on said cable for limiting the adjusting movement of said curtain in said frame, and a guide roller mounted at the lower end of said frame above said curtain roller and engaging the front face of said curtain for directing the latter into said front channels and against the front face of said screen.

CARL J. VOLLBERG.
EUGENE A. MYERS.